United States Patent [19]
Fujita et al.

[11] Patent Number: 5,872,587
[45] Date of Patent: Feb. 16, 1999

[54] LIGHT SIGNAL GENERATING DEVICE WITH REDUCED LIGHT LEAKAGE

[75] Inventors: Atsushi Fujita, Otsu; Kenichi Wada; Tomohiko Masuda, both of Takatsuki, all of Japan

[73] Assignee: Minolta Co., Ltd., Osaka, Japan

[21] Appl. No.: 138,639

[22] Filed: Oct. 18, 1993

Related U.S. Application Data

[63] Continuation-in-part of Ser. No. 913,593, Jul. 14, 1992, abandoned.

[30] Foreign Application Priority Data

| Jul. 16, 1991 | [JP] | Japan | 3-175130 |
| Oct. 23, 1992 | [JP] | Japan | 4-286330 |
| Feb. 22, 1993 | [JP] | Japan | 5-031547 |

[51] Int. Cl.$^6$ .............. B41J 2/385; B41J 2/435; B41J 2/47
[52] U.S. Cl. .............. 347/132; 347/136; 347/237; 347/239
[58] Field of Search .............. 346/107 R, 154; 358/298; 359/258, 264; 345/84, 204, 208; 347/237, 238, 240, 131, 132, 136

[56] References Cited

U.S. PATENT DOCUMENTS

| 4,060,802 | 11/1977 | Matsuki | 345/204 X |
| 4,475,115 | 10/1984 | Garbe et al. | 346/130 |
| 4,525,729 | 6/1985 | Agulnek et al. | 347/237 |
| 4,536,778 | 8/1985 | De Schamphelaere et al. | 347/130 |
| 4,727,428 | 2/1988 | Futatsugi et al. | 358/296 |
| 4,902,111 | 2/1990 | Matsubara et al. | 359/254 |
| 4,905,027 | 2/1990 | Itoh | 347/237 |
| 4,932,761 | 6/1990 | Shingaki et al. | 359/246 |
| 5,054,893 | 10/1991 | Schoon | 359/254 |
| 5,349,623 | 9/1994 | Itoh | 377/75 |

FOREIGN PATENT DOCUMENTS

| 63-189268 | 8/1988 | Japan . |
| 63-272568 | 11/1988 | Japan . |
| 1-272469 | 10/1989 | Japan . |

OTHER PUBLICATIONS

Mano, M. Morris, *Digital Design*, Prentice–Hall, Inc., Englewood Cliffs, New Jersey, 1984, pp. 53–57.

*TTL Logic Data Book*, Texas Instruments, Inc., 1988, pp. 2–891 thru 2–892.

*Primary Examiner*—David F. Yockey
*Attorney, Agent, or Firm*—Sidley & Austin

[57] ABSTRACT

A light signal generating device wherein a line of light shutter elements made of PLZT are turned on and off individually in accordance with a driving signal corresponding to image data, and each turned-on light shutter element generates a light signal. The light shutter elements are impressed with a specified voltage by order of a composite signal made by combining a modulation signal modulated in accordance with the image data and a micro duration pulse signal.

20 Claims, 15 Drawing Sheets

LIGHT SIGNAL GENERATING DEVICE WITH REDUCED LIGHT LEAKAGE

This application is a continuation-in-part of U.S. patent application Ser. No. 07/913,593 filed Jul. 14, 1992, now abandoned.

BACKGROUND OF THE INVENTION

1. Field of the Invention

The present invention relates to a light signal generating device, and more particularly to a light signal generating device using an electro-optical material such as PLZT. The light signal generating device is used for image formation in a display, a printer, a facsimile or the like.

2. Description of Related Art

A light signal generating device using an electro-optical material, especially using PLZT which has a large Kerr constant has been known (refer to U.S. Pat. Nos. 4,902,111 and 4,932,761). The light signal generating device has a light shutter array comprising a line of light shutter elements, a polarizer and an analyzer which are disposed before and after the light shutter elements respectively. The light shutter elements are driven individually and selectively in accordance with image data. Light shutter elements which are impressed with a voltage transmits a light, and light shutter elements which are not impressed with a voltage shuts off the light.

Incidentally, it has been proved from an experiment that a light shutter element which is turned on and off frequently has a less light leakage (the quantity of light transmitted through a light shutter element in an off-state) than a light shutter element which is kept off. Practically, the light shutter elements are driven individually in accordance with the respective image data. Accordingly, the light shutter elements vary in the light leakage, and thereby, it is difficult to obtain a desired contrast.

For reproduction of a multitone image, the following method is adopted. A time required for reproducing a picture element is divided into some periods, and in connection with each light shutter element, it is decided in accordance with multitone image data in which period(s) the light shutter element is to be turned on (see Japanese Patent Laid Open Publication No. 1-272469). In this method, the number of times which each light shutter element is turned on depends on the desired tone level for the picture element, which is indicated by the multitone image data, and accordingly the light shutter elements vary in the driving frequency. Because of the different driving frequencies, drivers for impressing the respective light shutter elements with a voltage have different temperatures. In other words, the light shutter elements are exposed to different temperatures. A light shutter element made of PLZT or the like has a characteristic that its light transmittance varies in accordance with the circumstantial temperature. Therefore, the light shutter elements at different temperatures have different light transmittances, and it is difficult to reproduce fine multitone images stably.

SUMMARY OF THE INVENTION

It is an object of the present invention to provide a light signal generating device which can form an image with a desired contrast.

Another object of the present invention is to provide a light signal generating device which has a reduced light leakage.

Another object of the present invention is to provide a light signal generating device which can reproduce fine multitone images stably.

A further object of the present invention is to provide a light signal generating device in which light shutter elements are at substantially the same temperature.

Furthermore, another object of the present invention is to provide a light signal generating device in which drivers for impressing the respective light shutter elements with a voltage have substantially the same driving frequency.

In order to attain the above objects, a light signal generating device according to the present invention comprises a light shutter array comprising a line of light shutter elements which have an electro-optical effect; first signal generating means for generating a first signal modulated in accordance with input data; second signal generating means for generating a second signal at a specified (constant) frequency; signal combining means for combining the first signal and the second signal and generating a composite signal; and driving means for impressing the light shutter elements with a voltage in accordance with the composite signal.

The second signal is a micro duration pulse signal which is generated regardless of the input data at substantially the same timing (frequency) as generation of the first signal.

In the structure, the light shutter elements are driven in accordance with a combination of the first signal, modulated in accordance with the input data, and the second signal, having a micro pulse duration. Accordingly, even light shutter elements which are not to be impressed with a voltage by order of the first signal are impressed with the voltage for a micro duration by order of the second signal. Thus, light shutter elements which are not impressed with a voltage at all in a conventional structure are impressed with a voltage in this structure, which decreases the light leakage of these light shutter elements. Consequently, an image with a fine contrast can be obtained. The pulse duration of the second signal is so short that the light shutter elements impressed with the voltage by order of the second signal will transmit virtually no light.

Another light signal generating device according to the present invention comprises: a light shutter array comprising a line of light shutter elements having an electro-optical effect; first pulse signal generating means for generating first pulse signals in accordance with multitone image data at timings to drive the light shutter elements, each of the first pulse signals having a pulse duration sufficient to turn on the light shutter elements; second pulse signal generating means for generating second pulse signals regardless of the multitone image data at substantially the same timing (frequency) as the generation of the first pulse signals; and driving means for impressing the light shutter elements with a voltage in accordance with the first pulse signals and the second pulse signals.

The second pulse signal is a micro duration pulse signal regardless of the multitone image data.

In the structure, the light shutter elements are driven in accordance with a combination of the first pulse signals, modulated in accordance with the multitone image data, and the second pulse signals having a micro pulse duration. Even light shutter elements which are impressed with a voltage at smaller frequencies (smaller numbers of times per a unit time) by order of the first pulse signals, modulated in accordance with the multitone image data, are impressed with the voltage additional numbers of times by order of the second pulse signals having a micro pulse duration. Thereby, all the light shutter elements are impressed with the voltage the same number of times per a unit time regardless of the desired tone level of each picture element, which is indicated by the multitone image data. Consequently, all the light shutter elements are at the same temperature and accordingly have substantially the same light transmittance, which guarantees stable reproduction of fine multitone images. Additionally, the light leakage of each light shutter element is decreased, and an image with a fine contrast can be obtained.

BRIEF DESCRIPTION OF THE DRAWINGS

These and other objects and features of the present invention will become apparent from the following description in reference to the accompanying drawings, in which:

FIG. 1 through FIG. 6 show a first embodiment of the present invention;

FIG. 1 is a schematic view of a printer employing a light signal generating device of the first embodiment;

FIG. 2 is an electrical circuit diagram showing a control circuitry of the light signal generating device of FIG. 1;

FIG. 3 is a graph showing the relation among surface potential of a photosensitive drum, exposure value, and tone under reversal (negative-positive) development;

FIG. 4 is a time chart showing timing of changing the levels of signals in the light signal generating device;

FIG. 5 is a schematic view of numerical image data;

FIG. 6 is a schematic view of data stored in a bit map memory, the data being converted from the image data shown in FIG. 5;

FIG. 7 is a schematic view of a light signal generating device of the second embodiment;

FIG. 8 is an electrical circuit diagram showing a control circuitry of the light signal generating device of FIG. 7;

FIG. 9 is a graph showing the relation between the pulse duration of a signal which drives a light shutter element and the light transmittance of the light shutter element;

FIG. 10 is a time chart showing timing of operation of the control circuitry;

FIG. 11 is a chart showing waves of a driving voltage impressed on the light shutter elements;

FIG. 12 is a perspective view of a light signal generating device of the third embodiment;

FIG. 13 is a time chart showing timing of operation of a control circuitry of the light signal generating device of FIG. 12;

FIG. 14 is a chart showing waves of a driving voltage impressed on the light shutter elements;

FIG. 15 is an electrical circuit diagram showing the control circuitry of the light signal generating device.

DETAILED DESCRIPTION OF THE PREFERRED EMBODIMENTS

Some light signal generating devices according to the present invention are hereinafter described with reference to the accompanying drawings. Each embodiment is a light signal generating device installed in a printer or a display device. The same components and portions in the following embodiments are referenced by the same numbers and marks.

First Embodiment: FIGS. 1–6

A first embodiment of the present invention is a light signal generating device installed in a printer.

Figure 1:
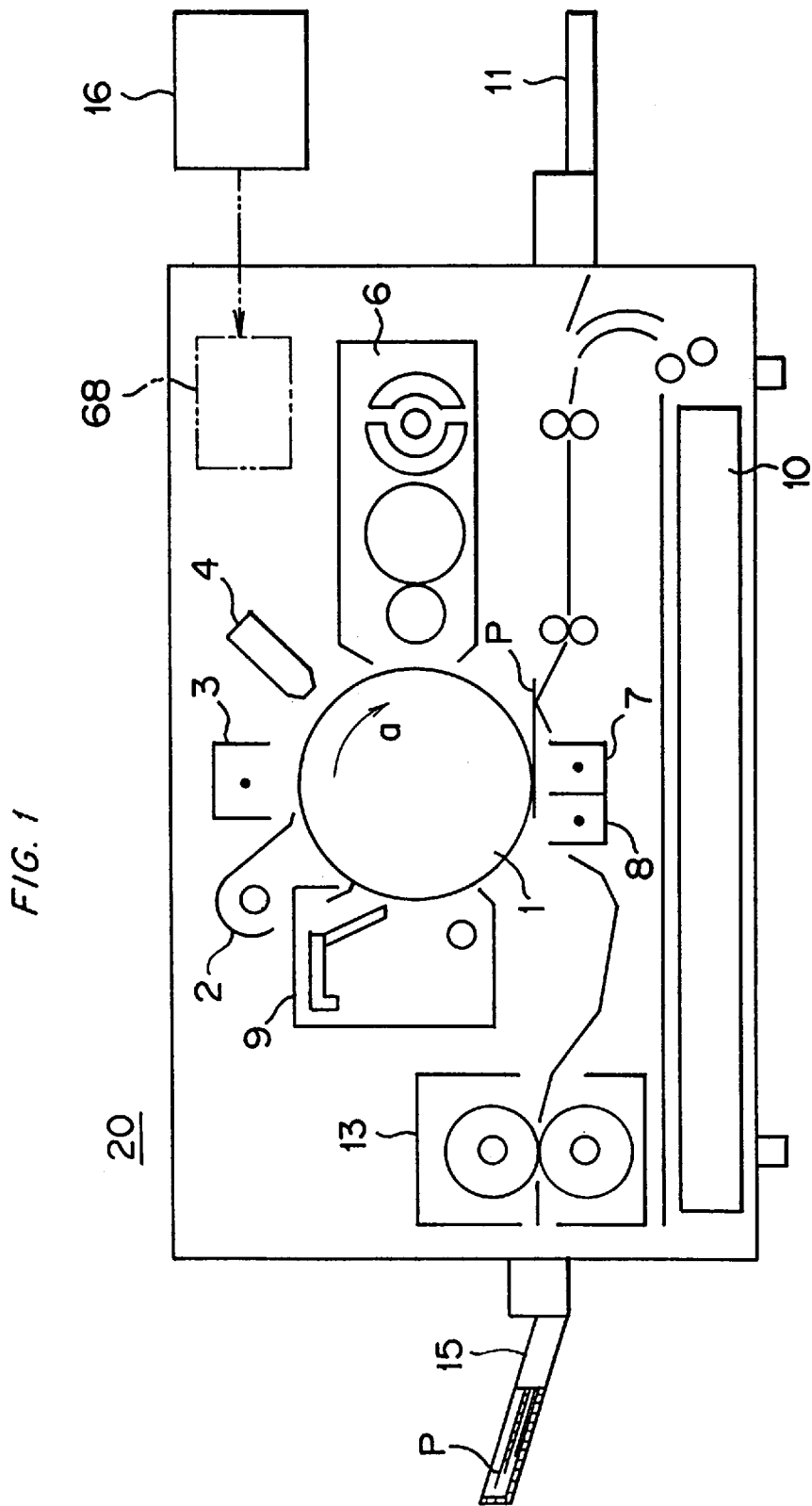

First, referring to FIG. 1, the structure and the operation of the printer are described. A photosensitive drum 1 is disposed substantially in the center of a printer 20 so as to be rotatable in a direction indicated with the arrow a. Around the photosensitive drum 1 are an eraser lamp 2, an electric charger 3, a write head 4 of a light signal generating device, a developing device 6, a transfer charger 7, a separation charger 8 and a cleaning device 9. The photosensitive drum 1 has a photosensitive layer thereon, and the photosensitive layer is electrically charged uniformly while the photosensitive drum 1 rotates passing the eraser lamp 2 and the electric charger 3. The write head 4 is driven in accordance with image data sent from a host computer 16 through a modulation unit 68 of the light signal generating device.

Recording sheets P are fed one by one from an automatic sheet feed tray 10, which is disposed in the lower part of the printer 20, or a manual sheet feed tray 11, which is disposed in the right side of the printer 20. Each recording sheet is fed to the transfer charger 7 in synchronization with an image formed on the photosensitive drum 1 to receive the image, and thereafter is separated from the photosensitive drum 1 by the separation charger 8. Then, the sheet P is fed to a fixing device 13 where the image is fixed on the sheet P and is ejected onto a tray 15. After the image transfer from the photosensitive drum 1 to the recording sheet, residual toner and residual charge on the photosensitive drum 1 are removed by the cleaning device 9 and the eraser lamp 2, such that the photosensitive drum 1 gets ready for the next image formation.

Figure 2:
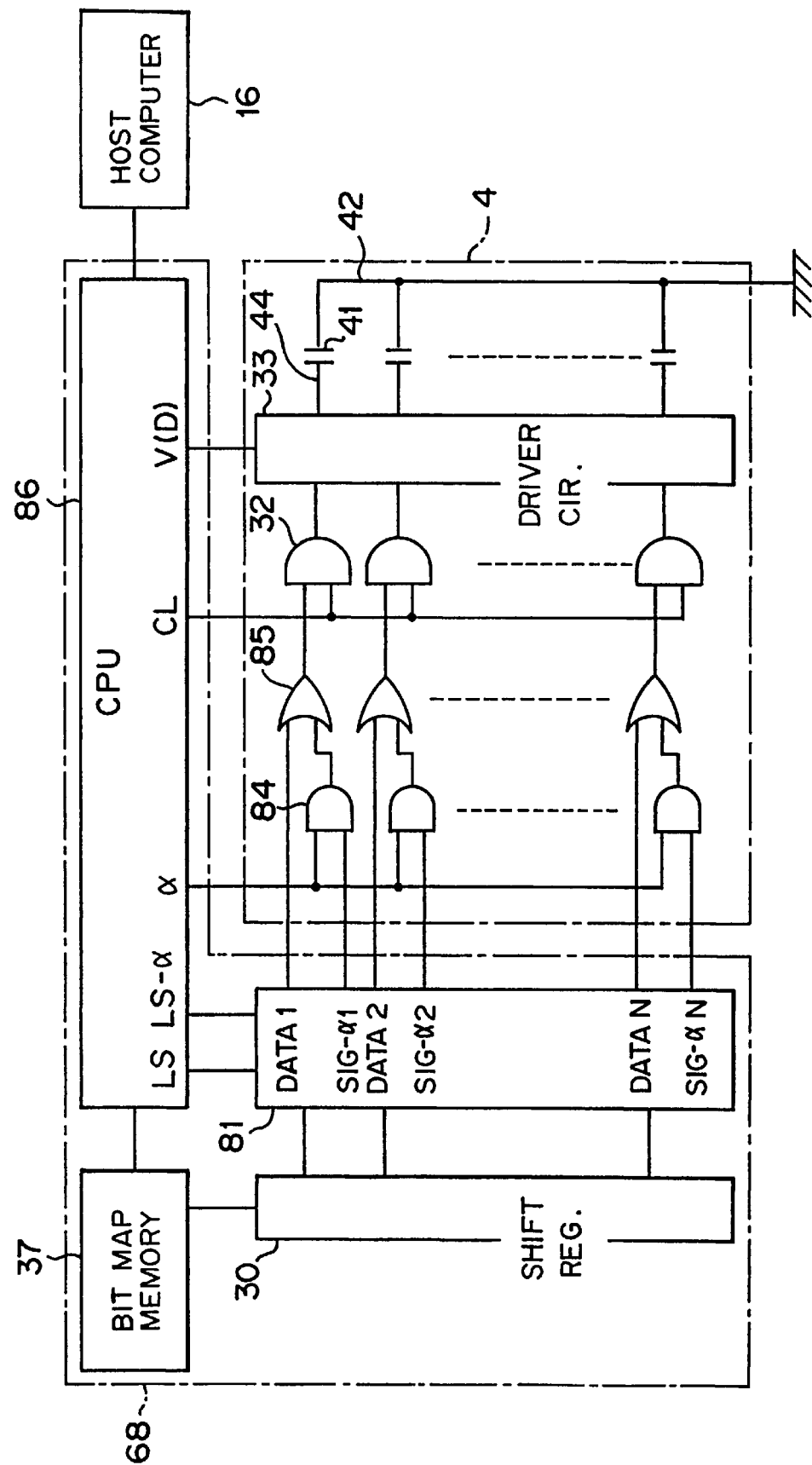

FIG. 2 shows the structure of the light signal generating device. The light signal generating device comprises the write head 4 and a modulation unit 68. The write head 4 comprises light shutter elements 41 which are made of PLZT, a driver circuit 33, AND elements 32, 84 and OR elements 85. These elements 32, 33, 41, 84 and 85 are disposed on a glass board. One end of each light shutter element 41 is grounded via a common electrode 42, and the other end thereof is connected with the driver circuit 33 via an individual electrode 44. The driver circuit 33 drives the light shutter elements 41 individually.

The driver circuit 33 is impressed with a driving voltage V(D) by order of a CPU 86 of the modulation unit 68. The output terminal of each AND element 32 is connected with an input terminal of the driver circuit 33, and the driver circuit 33 receives image signals in accordance with image data from the AND elements 32. Each light shutter element 41 is turned on to transmit a light emitted from a light source when the image signal sent from the corresponding AND element 32 is at a level of "H", and it is turned off to shut out the light emitted from the light source when the image signal sent from the corresponding AND element is at a level of "L". Each AND element 32 has two input terminals. Each AND element 32 receives a control signal CL which determines the exposure time from the CPU 86 through one of the input terminals. The other input terminal of each AND element 32 is connected with the output terminal of the corresponding OR element 85. Each OR element 85 has two input terminals. Each OR element 85 receives image data from the latch circuit 81 through one of the input terminals. The other input terminal of each OR element 85 is connected with the output terminal of the corresponding AND element 84. Each AND element 84 has two input terminals. Each AND element 84 receives a supplemental control signal α from the CPU 86 through one of the input terminals and receives supplementary data from the latch circuit 81 through the other input terminal.

The modulation unit 68 consists mainly of a shift register 30, the latch circuit 81, the CPU 86 and a bit map memory 37. The CPU 86 makes supplementary data from image data sent from a host computer 16, and the image data and the supplementary data are stored in the bit map memory 37. The bit map memory 37 first sends the supplementary data for one scanning line to the shift register 30 by order of the CPU 86. When the shift register 30 receives the supplementary data for one scanning line, the CPU 86 generates a latch pulse LS-α to the latch circuit 81, and the latch circuit 81 latches the supplementary data. The latch circuit 81 keeps on sending the supplementary data to the AND elements 84 as signals SIG-αn during scanning of the line. Each AND element 84 also receives the supplemental control signal α from the CPU 86, and only while the signal SIG-α is at a level of "H", each AND element 84 transmits the supplemental control data SIG α to the corresponding OR element 85. The supplemental control data SIG α sent to the OR element 85 is added to image data which are sent thereto from the latch circuit 81 through the other input terminal, and the image data and the signal SIG α are sent to the corresponding AND element 32.

The bit map memory 37 sends the image data for one scanning line to the shift register 30 subsequent to the sending of the supplementary data. When the shift register 30 receives the image data for one scanning line, the CPU 86 generates a latch pulse LS, and the latch circuit 81 latches the image data. Then, the image data are sent to the OR elements 85 and to the AND elements 32. When the control signal CL sent from the CPU 86 comes to the level of "H", the driving voltage V(D) is impressed on light shutter elements 41 which are selected in accordance with the image data. The light shutter elements 41 which are impressed with the driving voltage V(D) are turned on to transmit the light emitted from the light source and to expose the corresponding parts of the photosensitive drum 1. The exposure strength depends on the level of the driving voltage V(D). Light shutter elements 41 which are not impressed with the driving voltage V(D) are kept off to shut off the light emitted from the light source.

The following describes a case in which the light generating device of the first embodiment is installed in an image forming apparatus which performs reversal (negative-positive) development.

Figure 3:
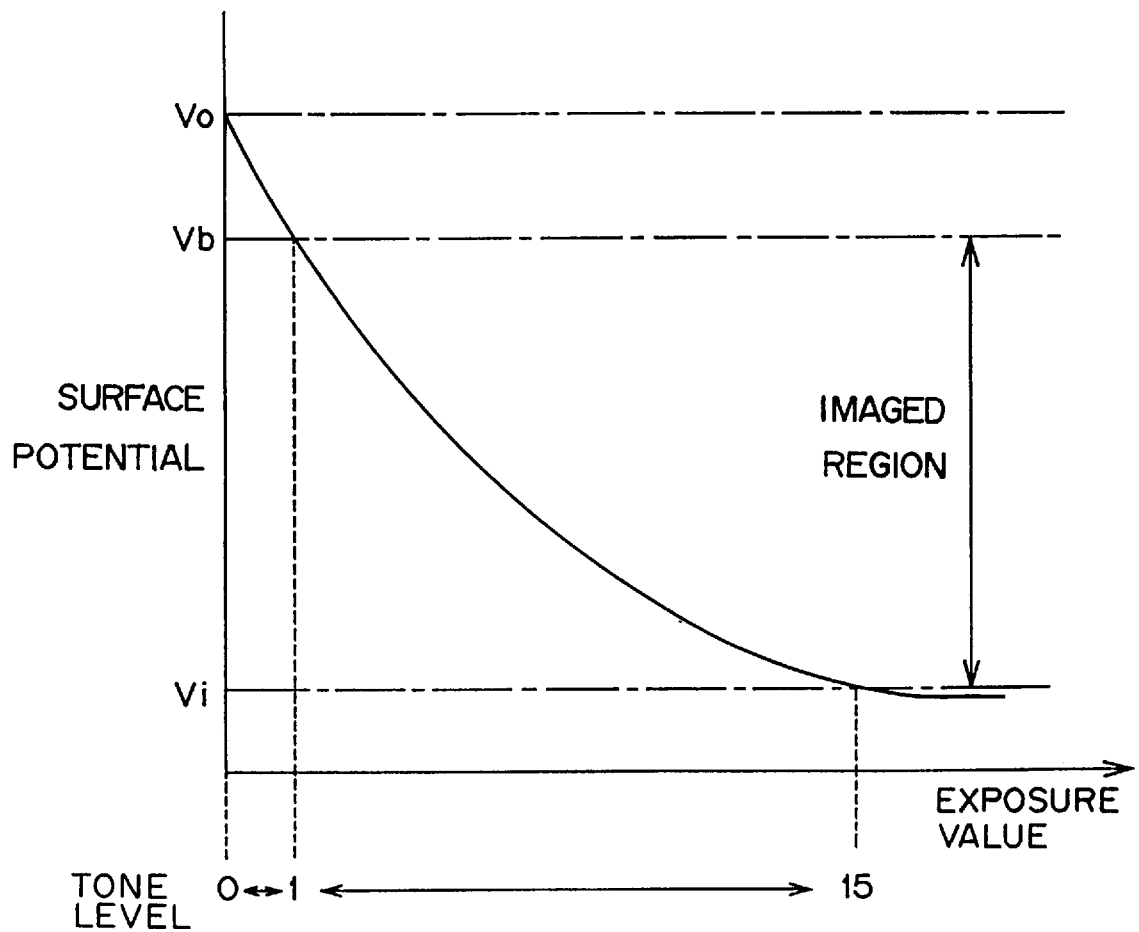

FIG. 3 shows the relation among surface potential of the photosensitive drum 1, exposure value and tone under the reversal development. In FIG. 3, Vo denotes an initial surface potential, Vb denotes a developing bias voltage, and Vi denotes a saturation point of the surface potential. As the exposure value is increasing, the surface potential is decreasing, though the decrease in the surface potential is not exactly proportional to the increase in the exposure value. Toner will be deposited on areas of which surface potential is in a range from Vb to Vi, that is, areas of which surface potential is in a range from Vb to Vi will be imaged regions. The tone of an image can be controlled by varying the surface potential within a range from Vb to Vi. Now, an image with 16 tone levels indicated by numerals from 0 to 15 is desired. A tone level of 0 indicates blank, and this is obtained from the initial surface potential Vo. A tone level of 1 indicates the lightest, and this is obtained from the surface potential Vb corresponding to the developing bias voltage. A tone level of 15 indicates the darkest, and this is obtained from the saturation point Vi of the surface potential. Regions with the tone level of 0 (blank regions) must be especially distinct from regions with the other toner levels (imaged regions). In order to do that, the difference between the potential Vo which results in the tone level of 0 and the potential Vb which results in the tone level of 1 must be sufficiently large, and in order to reduce the surface potential from Vo to Vb, a supplementary exposure value is required.

Figure 4:
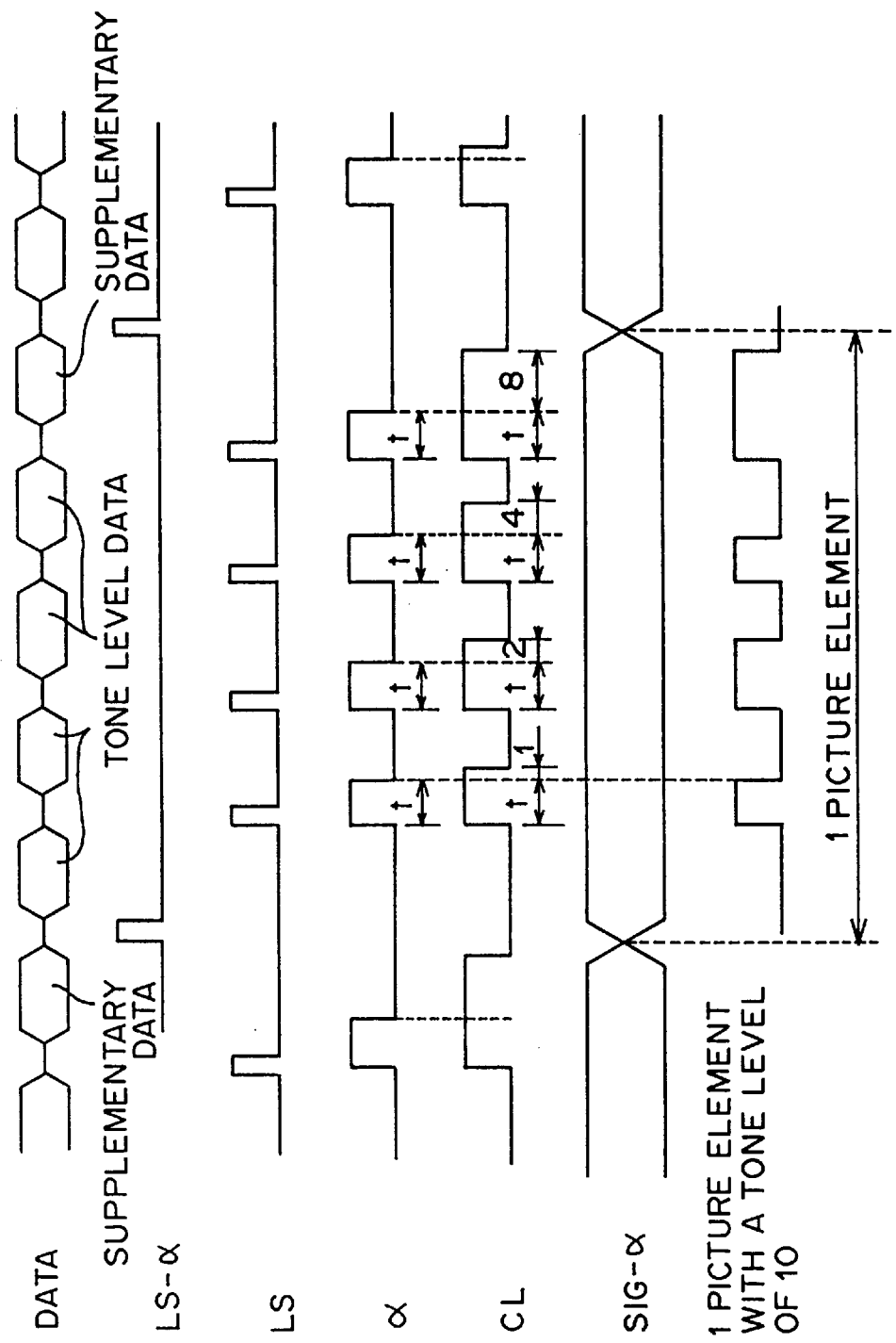

As shown in FIG. 4, a time required for scanning of one line is divided into four uniform periods, and control (selecting and driving) of the light shutter elements 41 is performed four times to scan one line, in other words, one picture element is formed by combining the total of four times of turning-on and turning-off of the corresponding light shutter element 41. The combination of turning-on and turning-off is made so that the accumulated exposure value of the corresponding picture element will lead to the desired tone level. A storage allocation of the bit map memory 37 for one scanning line is five times as large as that for one exposure of the line. A fixed voltage is impressed on the light shutter elements 41 in the four periods. As described above, in order to distinguish blank regions from imaged regions clearly, picture elements which will form the imaged regions require a supplementary exposure value. In this embodiment, the supplementary exposure value is allotted evenly among the four periods. Specifically, a driving time of each shutter element 41 to provide the supplementary exposure value is divided into four evenly, and the divided time is denoted by "t". Accordingly, the supplemental control signal α is kept at the level of "H" for the time "t" in each period. The time "t" is determined depending on the conditions of the photosensitive drum 1 and the circumstances. The control signal CL is kept at the level of "H" for different times in the four periods. More specifically, the control signal CL is kept at the level of "H" for a time "1+t" in the first period, for a time "2+t" in the second period, for a time "4+t" in the third period and for a time "8+t" in the fourth period. Fifteen tone levels from 1 (the lightest) to 15 (the darkest) can be made by combining the turning-on of the light shutter elements 41 in the four periods. For example, if a picture element with a tone level of 10 is desired, the corresponding light shutter element 41 is driven as indicated in FIG. 4. In this way, all the picture elements which will form imaged regions are provided with the supplementary exposure value, and the surface potential thereof is sufficiently reduced. Thereby, toner deposition on blank regions will never occur. This control system makes good use of time, and therefore the optical writing device has a high duty factor. This control prevents a possible problem that the exposure section may not respond sufficiently to the signal CL because the signal CL is kept at the level of "H" only for an extremely short time. In order to solve the problem, conventionally, the time for which the signal CL is kept at the level of "H" is a little lengthened so that the exposure section can respond to the signal CL. In the second embodiment, the light shutter elements 41 corresponding to picture elements which will form imaged regions are driven for at least the time "t" in every period.

Figures 5, 6:
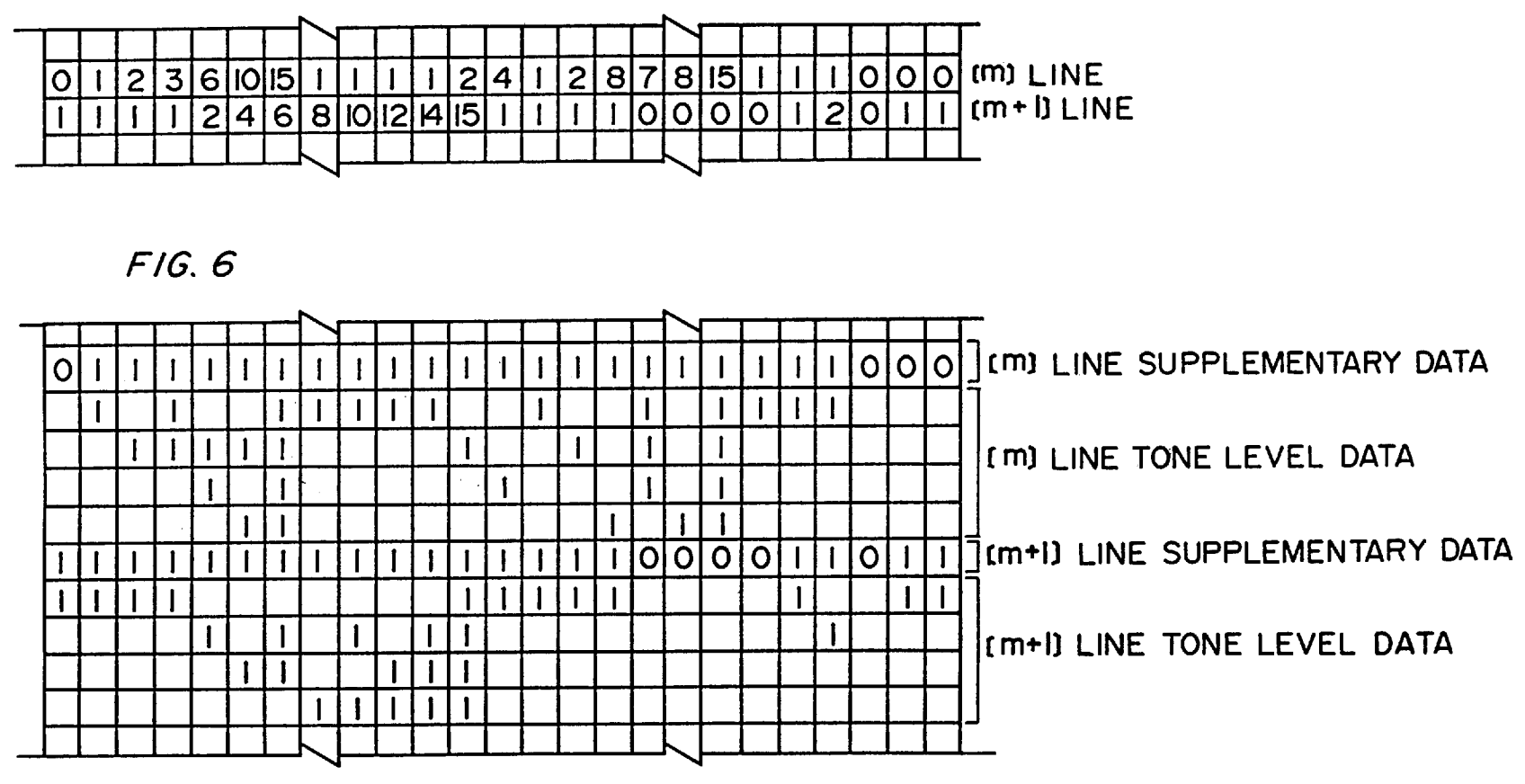

FIG. 5 shows desired tone levels of picture elements indicated by the numerals from 0 to 15. FIG. 6 shows data required for obtaining the tone shown in FIG. 5, and the data are stored in the bit map memory 37 so as to control each light shutter element 41 in cooperation with the control signal CL in the above-described manner. The supplementary data distinguish picture elements of blank regions and picture elements of imaged regions from each other. A state of "1" of the supplementary data commands that the corresponding signal SIG-α maintain the level of "H" during the four-period scanning of the picture element to drive the corresponding light shutter element 41 for the time "t" in every of the four periods. The image data determine the tone levels of the picture elements in the imaged regions. A state of "1" of the image data commands that the corresponding light shutter element 41 be driven for the time "1", "2", "4" or "8" in addition to the time "t" in the designated period.

The supplementary exposure time does not have to be allotted to the four periods evenly. If there is a period where the control signal CL is at the level of "H" for an extremely short time, the drive of light shutter elements in the period will be ensured by allotting a larger share of the supplementary exposure time to that period.

In the first embodiment, the tone levels from 1 to 15 are made by controlling the exposure time based on a presumption that the surface potential of the photosensitive drum decreases in proportional to an increase in the exposure value. As described above, however, the decrease in the surface potential is not exactly proportional to the increase in the exposure value. The exposure time may be controlled so that each picture element will obtain the exact surface potential which realizes the desired tone level.

Although the above description is only about a case wherein the light signal generating device is used for reversal (negative-positive) development, the light signal generating device can also be used for normal (positive-positive) development. In using the light signal generating device for the normal development, picture elements which will form blank regions are provided with the supplementary exposure value. Thereby, toner deposition on the picture elements will never occur, and clear blank regions can be obtained.

In the above description, the light signal generating device is used to obtain an image with 16 tone levels, but it can be used to obtain an image with any number of tone levels.

Second Embodiment: FIGS. 7–11

A second embodiment is a light generating device installed in a display.

Figure 7:
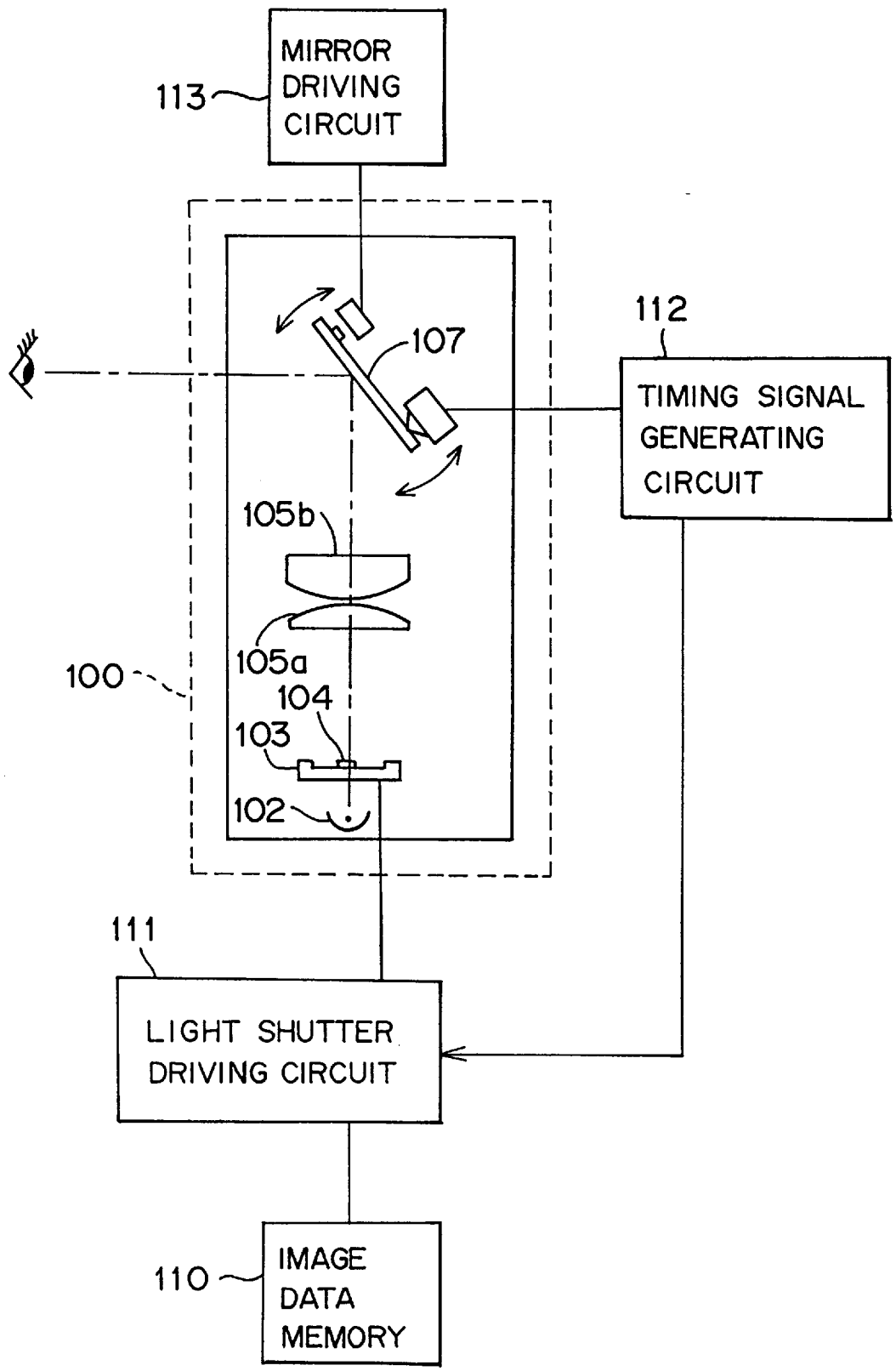
FIG. 7 through FIG. 11 show a second embodiment of the present invention.

FIG. 7 shows an optical system 100 of a light signal generating device. The optical system 100 consists mainly of a light source 102, a light shutter array 103, projection lenses 105a and 105b, and a resonance mirror 107. As the light source 102, a halogen lamp, a fluorescent lamp or a metal halide lamp is used. A light emitted from the light source 102 is guided to the light shutter array 103 via a polarizer (not shown). The light shutter array 103 is made of PLZT or the like which has an electro-optical effect, and comprises a line of light shutter elements 104. The light shutter elements 104 are individually impressed with a specified voltage in accordance with image data so as to transmit the light. The light transmitted through the light shutter elements 104 is guided to the projection lenses 105a and 105b via an analyzer (not shown). The light transmitted through the projection lenses 105a and 105b reflects on the mirror 107 as a linear image. The resonance mirror 107 vibrates at a high speed, which brings an afterimage effect. Because of the afterimage effect, the image is visible to the observer.

Next, a driving circuitry of the optical system 100 is described.

The driving circuitry comprises an image data memory 110, a light shutter driving circuit 111, a timing signal generating circuit 112, and a mirror driving circuit 113. The image data memory 110 is stored with binary monochromatic image data.

Figure 8:
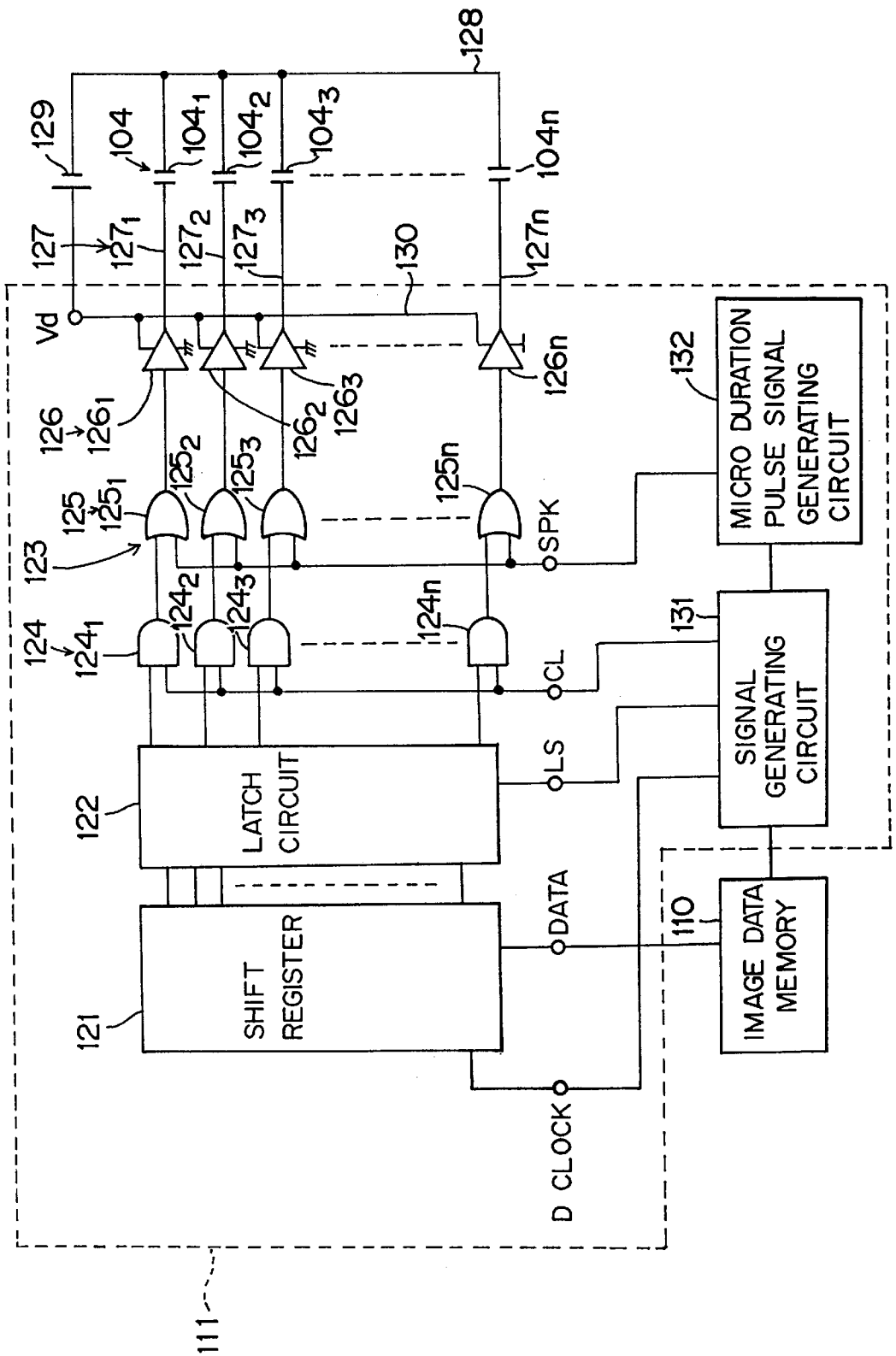
Figure 9:
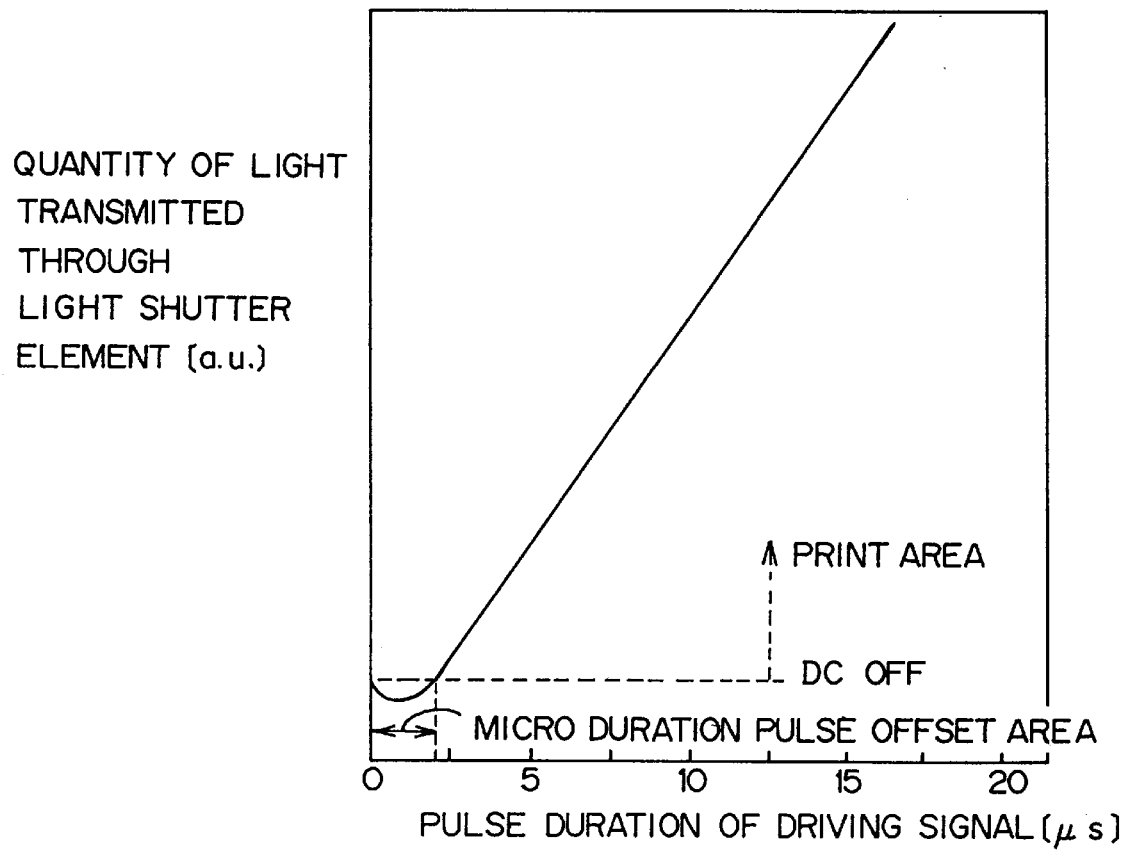

The detailed composition of the light shutter driving circuit 111 is shown in FIG. 8. The light shutter driving circuit 111 comprises a shift register 121, a latch circuit 122, a driver IC 123, a signal generating circuit 131, and a micro duration pulse signal generating circuit 132. The driver IC 123 comprises AND elements 124, OR elements 125 and high voltage drivers 126. Individual electrodes 127 (127$_1$, 127$_2$ . . . 127$_n$) formed on one side of the respective light shutter elements 104 (104$_1$, 104$_2$, . . . 104$_n$) are connected with the high voltage drivers 126 (126$_1$, 126$_2$, . . . 126$_n$), and a common electrode 128, formed on the other side of the light shutter elements 104, is ground. A power source 129 of the driving circuit is provided between a power source line 130 connected with power supply terminals of the high voltage drivers 126 and the common electrode 128.

The image data stored in the image data memory 110 are serially transmitted to the shift register 121. The transmission of the image data is performed in synchronization with a transmission clock signal DCLOCK which is generated by the signal generating circuit 131 and sent to the shift register 121. When image data for one line have been transmitted, a latch strobe signal LS is generated by the signal generating circuit 131 and sent to the latch circuit 122. Thereby, the image data are latched. The latched image data are immediately transmitted to the AND elements 124 (124$_1$, 124$_2$, . . . 124$_n$) through one of the input terminals of each element 124.

A control signal CL is generated by the signal generating circuit 131 and sent to the AND elements 124 through the other input terminal of each element 124. Each AND element 124 generates a modulation signal of a high level when the image data DATA and the control signal CL sent to the AND element 124 are both at a high level. The modulation signal is transmitted to the OR elements 125 (125$_1$, 125$_2$, . . . 125$_n$) through one of the input terminals of each element 125.

A micro duration pulse signal SPK is generated by the micro duration pulse signal generating circuit 132 and sent to the OR elements 125 through the other input terminal of each element 125 in synchronization with the transmission of the modulation signal. Thus, each OR element 125 generates a signal in accordance with combination of the modulation signal and the micro duration pulse signal, and the signal is sent to the corresponding driver 126. Then, the individual electrode 127 of the light shutter element 104 corresponding to the driver 126 is impressed with a driving voltage Vd. The pulse duration of the micro duration pulse signal SPK generated by the micro duration pulse generating circuit 132 is preferably not more than $1\mu$ sec. This is because each light shutter element transmits a smaller quantity of light when it is impressed with a voltage with a pulse duration of not more than $2\mu$ sec. than when it is impressed with a direct voltage of 0 volt (see FIG. 9).

The light shutter elements 104 are impressed with a voltage in accordance with the micro duration pulse signal SPK even when they are not impressed with a voltage in accordance with the modulation signal. The impression of a voltage in accordance with the micro duration pulse signal decreases light leakage, and an image with a high contrast can be obtained.

Incidentally, the timing signal generating circuit 112 generates a timing signal to make the control signal CL coincident with the vibration of the resonance mirror 107. The resonance mirror 107 is driven by the mirror driving circuit 113 so as to vibrate at a specified period. These circuits are not so largely different from conventional ones and can be structured inexpensively.

Figure 10:
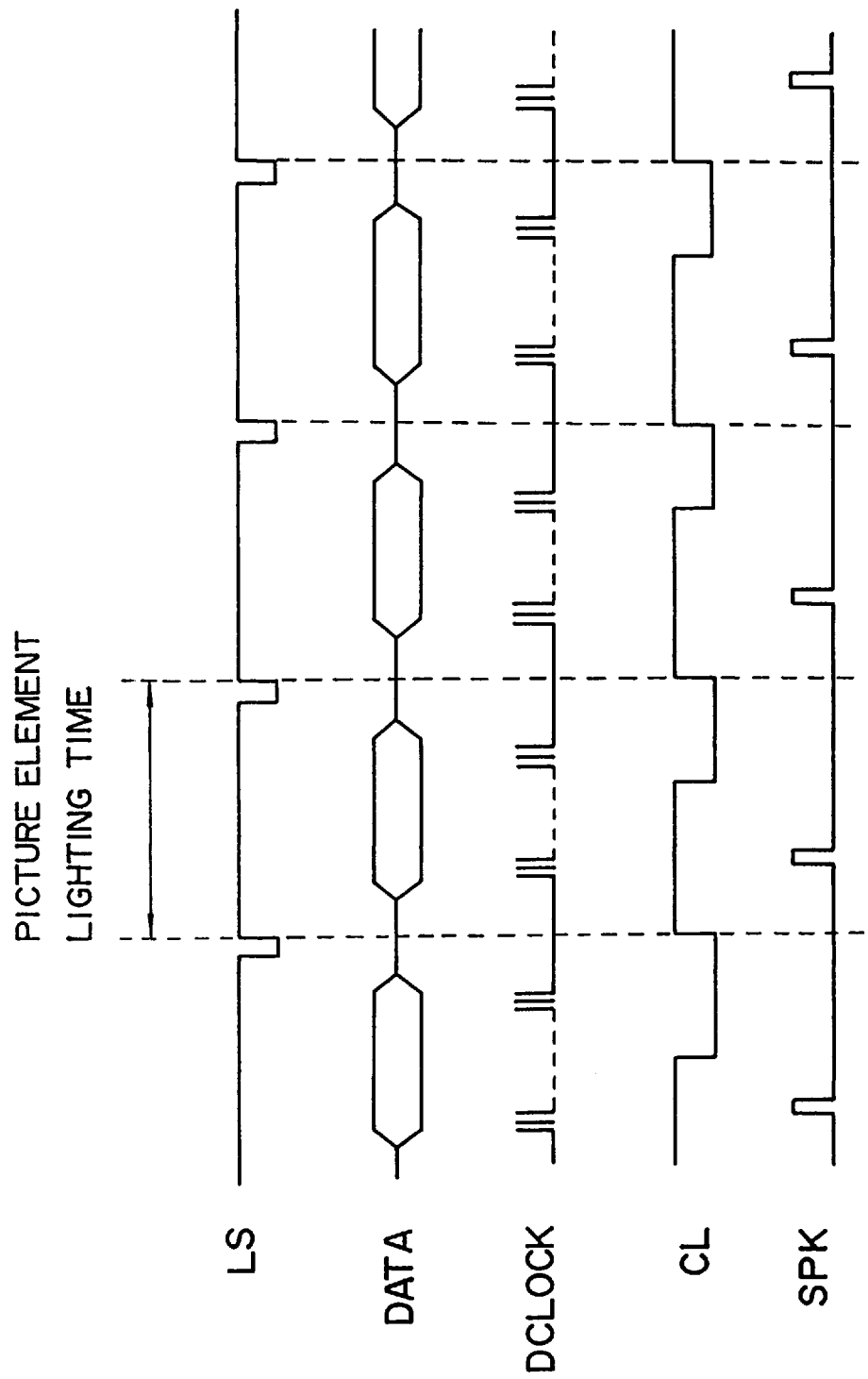
Figure 11:
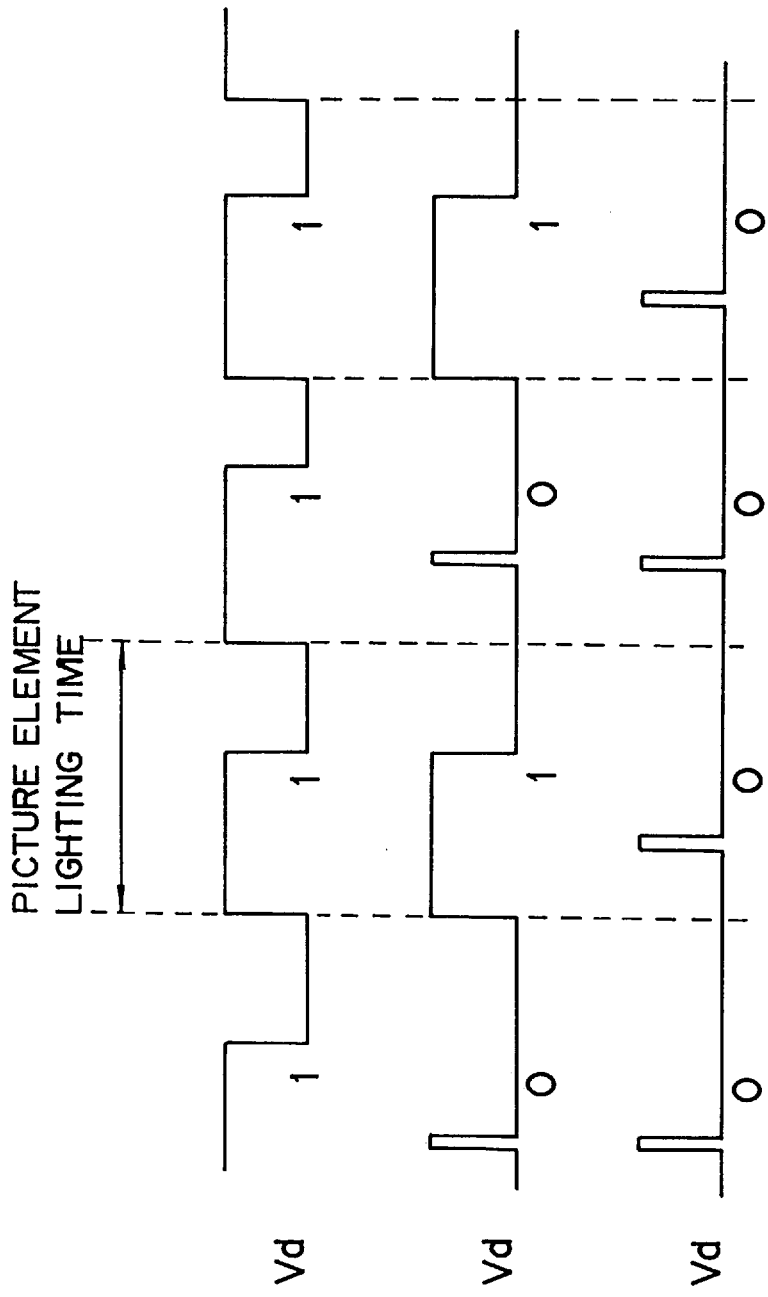

Next referring to FIGS. 10 and 11, the timing of operation is described.

During a picture element lighting time, while the control signal CL is at a high level with a peculiar pulse duration, the light shutter elements 104 are impressed with the driving voltage Vd in accordance with the image data DATA to transmit a light. The micro duration pulse signal SPK is generated once during the picture element lighting time regardless of the image data DATA. While the micro duration pulse signal SPK is at a high level, the light shutter elements 104 are impressed with the driving voltage Vd. However, the light shutter elements 104 transmit virtually no light for the duration.

The light shutter elements 104 are impressed with the driving voltage Vd in accordance with both the image data DATA and the micro duration pulse signal SPK. In the second embodiment, during the picture element lighting time, image data DATA for the next one line is transmitted to the shift register 121.

FIG. 11 shows three examples of image data DATA controlling a light shutter element 104 for four consecutive picture element lighting times and waves of the driving voltage Vd to be impressed on the tight shutter element 104 in accordance with each of the examples. The top line shows a case wherein the image data are "1111". The middle line shows a case wherein the image data are "0101". The bottom line shows a case wherein the image data are "0000". As shown in FIG. 11, even when the image data is "0", the light shutter elements 104 are impressed with the driving voltage Vd in accordance with the micro duration pulse signal SPK. Thus, the light shutter elements 104 are impressed with the driving voltage Vd regularly regardless of the image data DATA. Thereby, the light leakage from each light shutter element 104 is decreased, and consequently, an image with a high contrast can be obtained.

In the second embodiment, the micro duration pulse signal SPK is generated in every picture element lighting time whether the modulation signal is at a high level or at a low level. However, the driving circuitry can be so made that the micro duration pulse signal SPK is not generated in a picture element lighting time in which the modulation signal comes to a high level. In this case, more specifically, the image data is reversed, and the micro duration pulse signal SPK is generated in accordance with the reversed image data.

The second embodiment has been described in connection with formation of a monochromatic image. However, by using a light shutter array of a three-color structure or by using a color filter, the second embodiment is applicable to formation of a color image.

Third Embodiment: FIGS. 12–15

A third embodiment is a printer provided with a light signal generating device according to the present invention.

Figure 12:
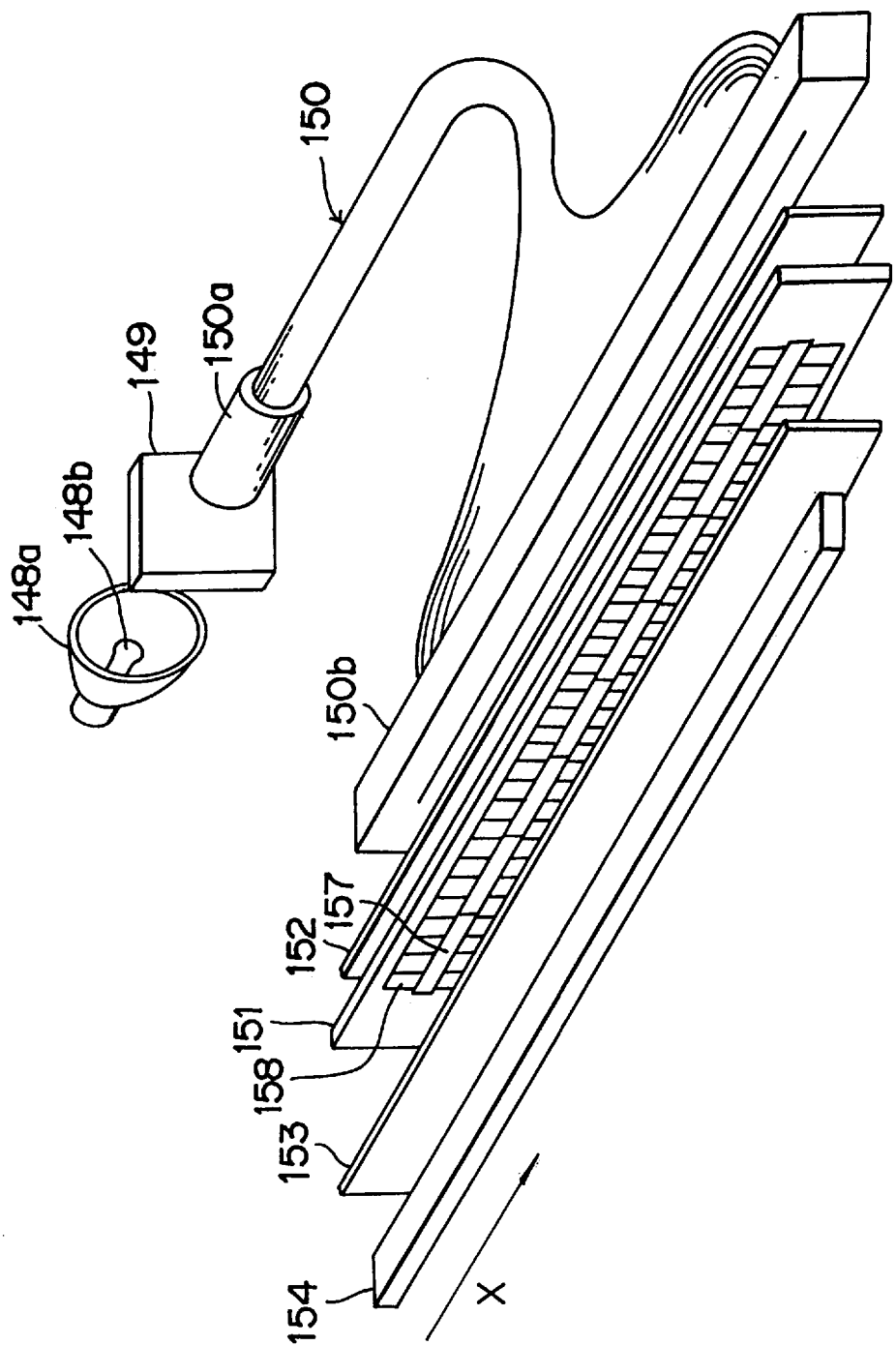
FIG. 12 through FIG. 15 show a third embodiment of the present invention.

FIG. 12 shows the general structure of the light signal generating device. The light signal generating device comprises a light source 148b provided with a reflective mirror 148a, a heat-proof filter 149, an optical fiber array 150, polarizers 152, an analyzer 153, a light shutter array 151 and an imaging lens array 154. As the light source 148b, a halogen lamp, a fluorescent lamp, a metal halide lamp or the like is used.

The optical fiber array 150 comprises a large number of optical fibers. The optical fibers are bundled at one end, and the bundled end faces the light source 148b and functions as a light receiving portion 150a. At the other end of the optical fiber array 150, the optical fibers are arranged in a main scanning direction (direction indicated with arrow X), and the end functions as a light emergent portion 150b. The light shutter array 151 has light shutter chips 157 made of PLZT, which are arranged in a line on a glass board. The line of light shutter chips 157 comprises a line of light shutter elements ($162_1$, $162_2$, . . . $162_n$) which will be described later, individual electrodes 163 ($163_1$, $163_2$, . . . $163_n$) disposed at a side of the line of light shutter elements 162 and a common electrode 164 disposed at the other side of the line of light shutter elements 162. At both sides of the line of light shutter chips 157, a driver IC 158 for driving each of the light shutter elements 162 is disposed. The driver IC 158 incorporates AND elements 174, OR elements 175 and high voltage drivers 176, which will be described later. The lens array 154 comprises a number of convergent rod lenses and functions to image a light on a photosensitive drum (not shown).

A light radiated from the light source 148b is collected by the reflective mirror 148a, and the light passes through the optical fiber array 150 and emerges from the light emergent portion 150b in a line along the main scanning direction X. The light passes through the polarizer 152 and irradiates the light shutter array 151. Each of the light shutter elements 162 is impressed with a specified voltage in accordance with image data, controlled by the driver IC 158. A light shutter element 162 which is impressed with the voltage rotates the plane of polarization of the light transmitted through the polarizer 152 and transmits the light. The light transmitted through the light shutter elements 162 which are impressed with the voltage passes through the analyzer 153. Then, the light images on the photosensitive drum via the lens array 154.

Figure 13:
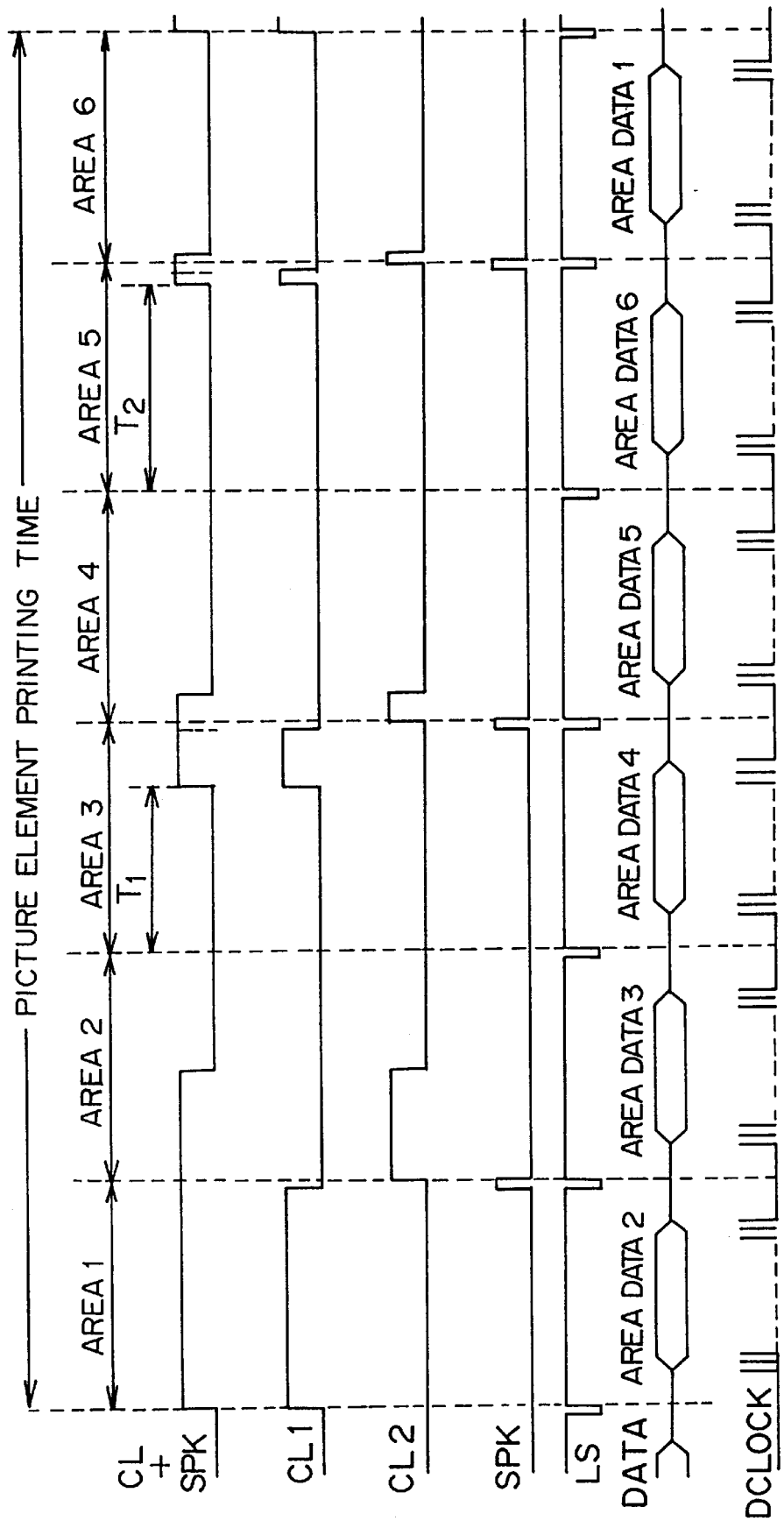
Figure 14:
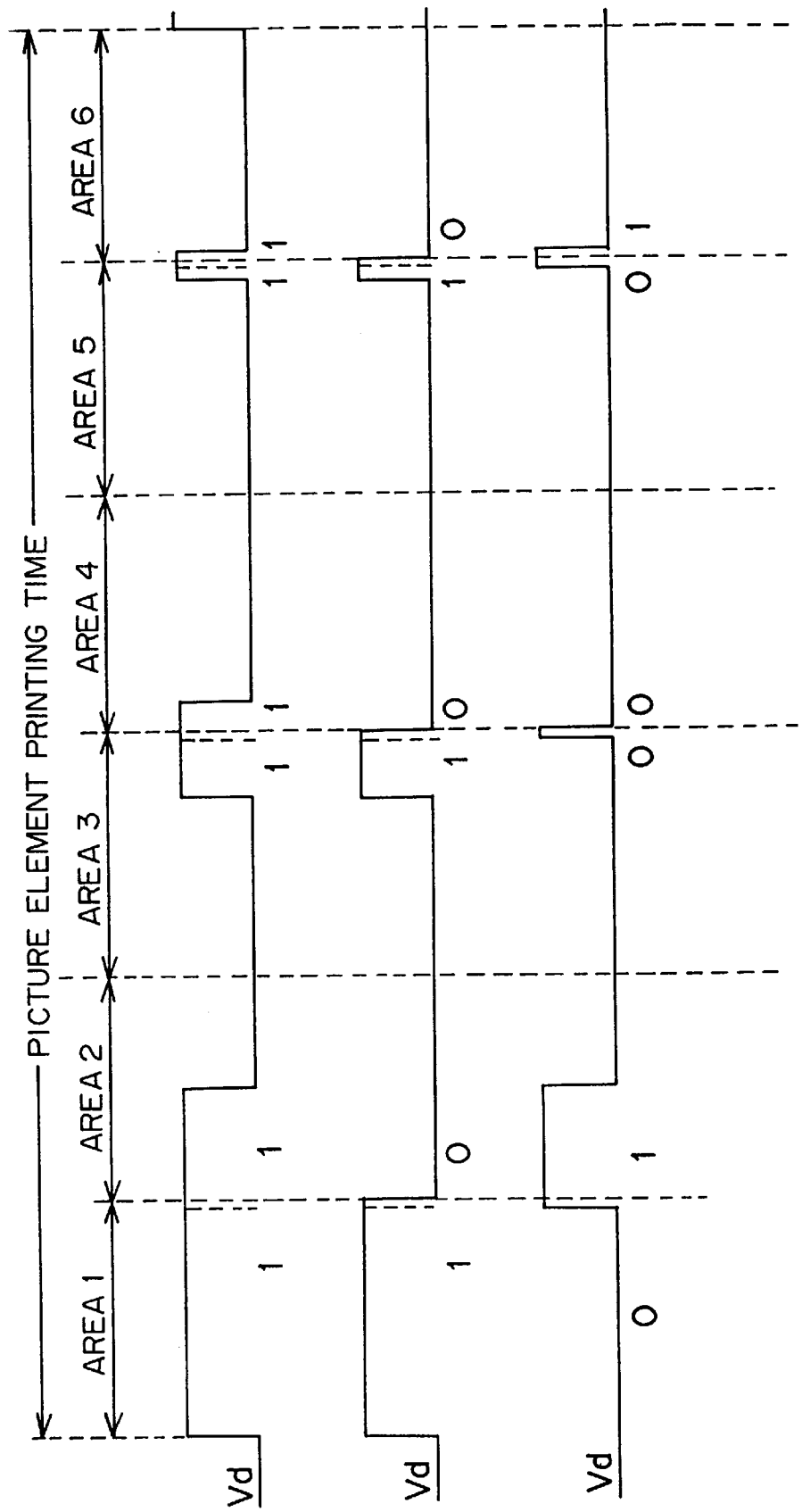

Next referring to FIGS. 13 and 14, multitone image reproduction by a pulse duration modulating method and the frequency of a driving signal (the number of times of turning-on and turning-off per a unit time) are described. In the third embodiment, an image is reproduced with 64 tones from 0 to 63.

First, a picture element printing time is divided into 6 areas, and the pulse durations of a control signal CL, which is generated in accordance with six-bit image data, in the areas 1 to 6 have a ratio of 32:16:8:4:2:1. The control signal CL is a combination of a control signal CL1 and a control signal CL2. The control signal CL1 has waves corresponding to the pulse durations of 32, 8 and 2. The control signal CL2 has waves corresponding to the pulse durations of 16, 4 and 1. While the control signal CL is at a high level with a peculiar pulse duration in each area, the light shutter elements 162 are impressed with a driving voltage Vd (see FIG. 14) individually and selectively in accordance with the image data. With respect to each light shutter element 162, by selecting areas in which the light shutter element 162 is impressed with the driving voltage Vd, a multitone image can be obtained.

Meanwhile, a micro duration pulse signal SPK is turned on and off three times during the picture element printing time. More specifically, the micro duration pulse signal SPK is turned on in the areas 1, 3 and 5 of the picture element printing time. The pulse duration of the signal SPK is set to such a short time that the light shutter elements 162 transmits virtually no light for the duration. While the micro duration pulse signal SPK is on, a current flows in the high voltage drivers 176, and the flight shutter elements 162 are impressed with the driving voltage Vd.

The above-described control signal CL and the micro duration pulse signal SPK are combined. The driver IC 158 is structured such that a driving signal (CL+SPK) is generated only once in two consecutive areas, the areas 1 and 2, the areas 3 and 4, and the areas 5 and 6. More specifically, the timing of generating the control signal CL is delayed for a time T1 and a time T2 in the areas 3 and 5 respectively so that the high-state durations of the signal CL in the areas 3 and 5 will come closer to the high-state durations of the signal CL in the areas 4 and 6 respectively. Also, the micro duration pulse signal SPK is generated such that the high-state durations of the signal SPK will occur in the gaps between the high-state durations of the control signal CL in the areas 1 and 2, between those in the areas 3 and 4, and between those in the areas 5 and 6. With this arrangement, the number of turning on and off each light shutter element 162 per a unit time can be decreased, which prevents the high voltage drivers 176 from being heated. Accordingly, the temperature in the circumstances of the light shutter elements 162 does not change remarkably, which prevents changes in the light transmittance of the light shutter elements 162.

The image data DATA are transmitted to a shift register 171, which will be described later, in synchronization with a transmission clock signal DCLOCK. When image data for one line have been transmitted, a latch strobe signal LS is generated, and accordingly the transmitted data are latched by a latch circuit 172, which will be described later. Then, the light shutter elements 162 are impressed with the driving voltage Vd individually while the control signal CL is in a high level. In the third embodiment, in order to form a multitone image, one-line image data are divided into 6 sections, from area data 1 to area data 6, and the data transmission is carried out section by section. For example, while the light shutter elements 162 are driven in accordance with the area data 1 (in the area 1), the area data 2 are transmitted to the shift register 171, and while the light shutter elements 164 are driven in accordance with the area data 2 (in the area 2), the area data 3 are transmitted to the shift register 171.

FIG. 14 shows three examples of multitone image data DATA controlling a light shutter element 162 for printing of one picture element and waves of the driving voltage Vd to be impressed on the light shutter element 162 in accordance with each of the examples. The light shutter element 162 transmits light in accordance with image data of "1" and shuts off light in accordance with image data of "0". The top Line in FIG. 14 shows a case wherein the image data are "111111" (tone level of 63). The middle line in FIG. 14 shows a case wherein the image data are "101010" (tone level of 42). The bottom line in FIG. 14 shows a case wherein the image data are "010001" (tone level of 17). As shown in the areas 3 and 4 of the bottom line, even when image data for two consecutive areas are both "0", the light shutter element 162 is impressed with the driving voltage Vd in accordance with the micro duration pulse signal SPK. Thus, each light shutter element 162 is impressed with the driving voltage Vd three times in accordance with the micro duration pulse signal SPK regardless of the image data DATA. Consequently, all the light shutter elements 162 have the same driving frequency regardless of the image data.

Figure 15:
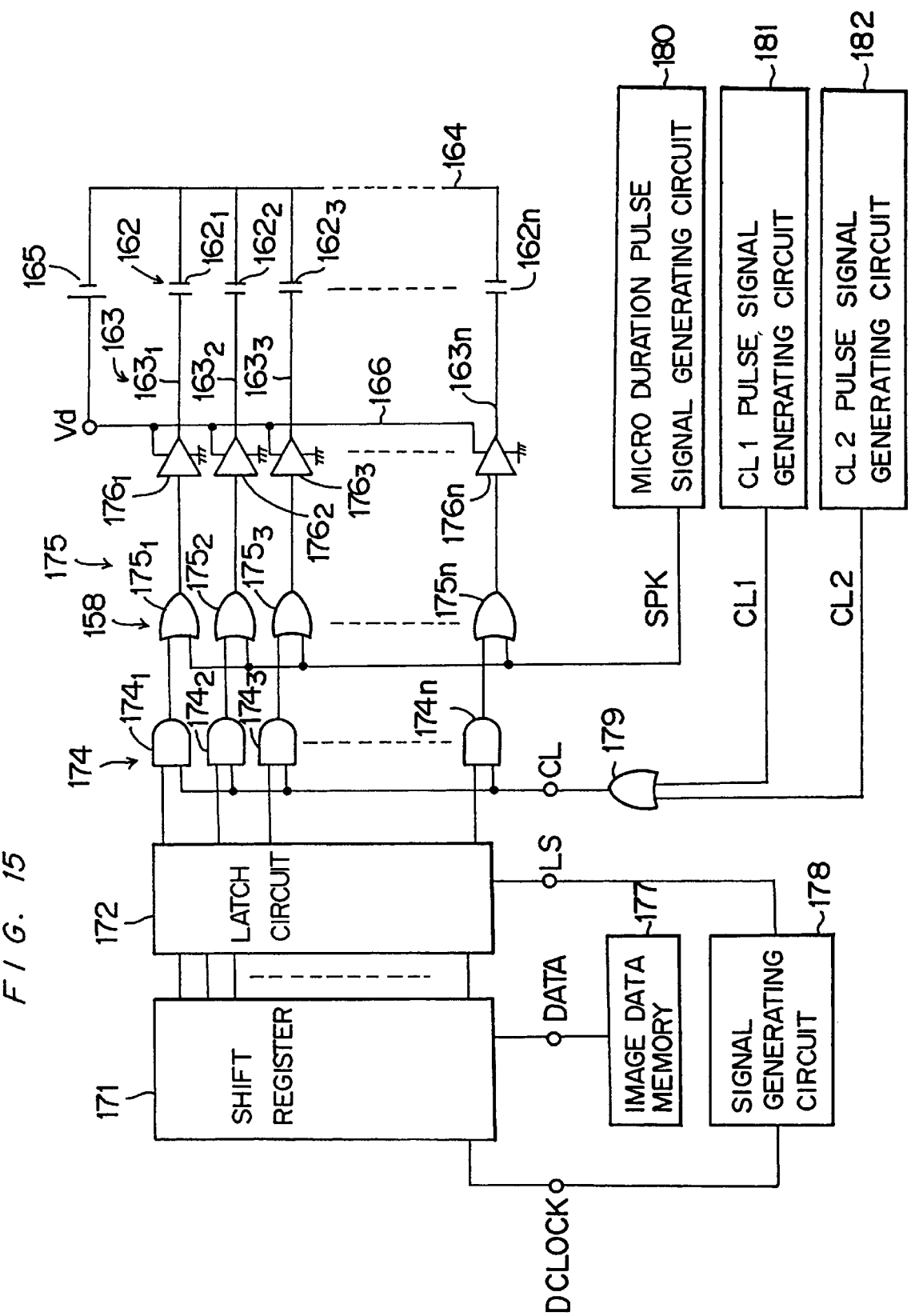

FIG. 15 shows a control circuitry for carrying out the above-described control.

The control circuitry comprises a shift register 171, a latch circuit 172, a driver IC 158, an image data memory 177, a signal generating circuit 178, a micro duration pulse signal generating circuit 180, a CL1 pulse signal generating circuit 181 and a CL2 pulse signal generating circuit 182. Individual electrodes 163 ($163_1$, $163_2$, ... $163_n$) formed on one side of the line of light shutter elements 162 ($162_1$, $162_2$, ... $162_n$) are connected with high voltage driver 176 ($176_1$, $176_2$, ... $176_n$). A common electrode 164 formed on the other side of the line of light shutter elements 162 is grounded. A power source 165 is disposed between a power line 166 connected with power supply terminals of the high voltage drivers 176 and the common electrode.

Image data are sent from a host computer (not shown) to the image data memory 177, and the image data stored in the memory 177 are serially transmitted to the shift register 171 area by area. The data transmission is carried out in synchronization with a transmission clock signal DCLOCK which is generated by the signal generating circuit 178 and sent to the shift register 171. When one-area one-line image data have been transmitted, a latch strobe signal LS is generated by the signal generating circuit 178 and sent to the latch circuit 172. In accordance with this signal LS, the area data are sent to the respective AND elements 174 ($174_1$, $174_2$, ... $174_n$) through one of the input terminals.

Signals CL1 and CL2, which are generated by the pulse signal generating circuits 181 and 182 respectively, are both sent to an OR element 179, and these signals CL1 and CL2 are superimposed to be a control signal CL. The control signal CL is sent to each AND element 174 through the other input terminal. Accordingly, each AND element 174 generates a modulation signal of a high level when both the area data and the control signal CL are both at a high level. The modulation signal is sent to the corresponding OR element 175 through one of the input terminals. The micro duration pulse signal SPK which is generated by the micro duration pulse signal generating circuit 180 is sent to the OR element 175 through the other input terminal. A signal made by combining the modulation signal and the micro duration pulse signal SPK is sent to the corresponding high voltage driver 176. Then, the individual electrode 163 of the corresponding light shutter element 162 is impressed with the driving voltage Vd.

The pulse duration of the micro duration pulse signal SPK is as short as that in the second embodiment and preferably 1 to $2\mu$ sec.

In this way, the light shutter elements 162 are impressed with the driving voltage in accordance with the micro duration signal SPK in addition to the image data DATA. Thereby, all the light shutter elements 162 are impressed with the voltage the same number of times per a unit time, that is, have the same driving frequency. Consequently, the light shutter elements 162 are at almost the same circumstantial temperature, and fine multitone images can be reproduced stably.

Figure 16:
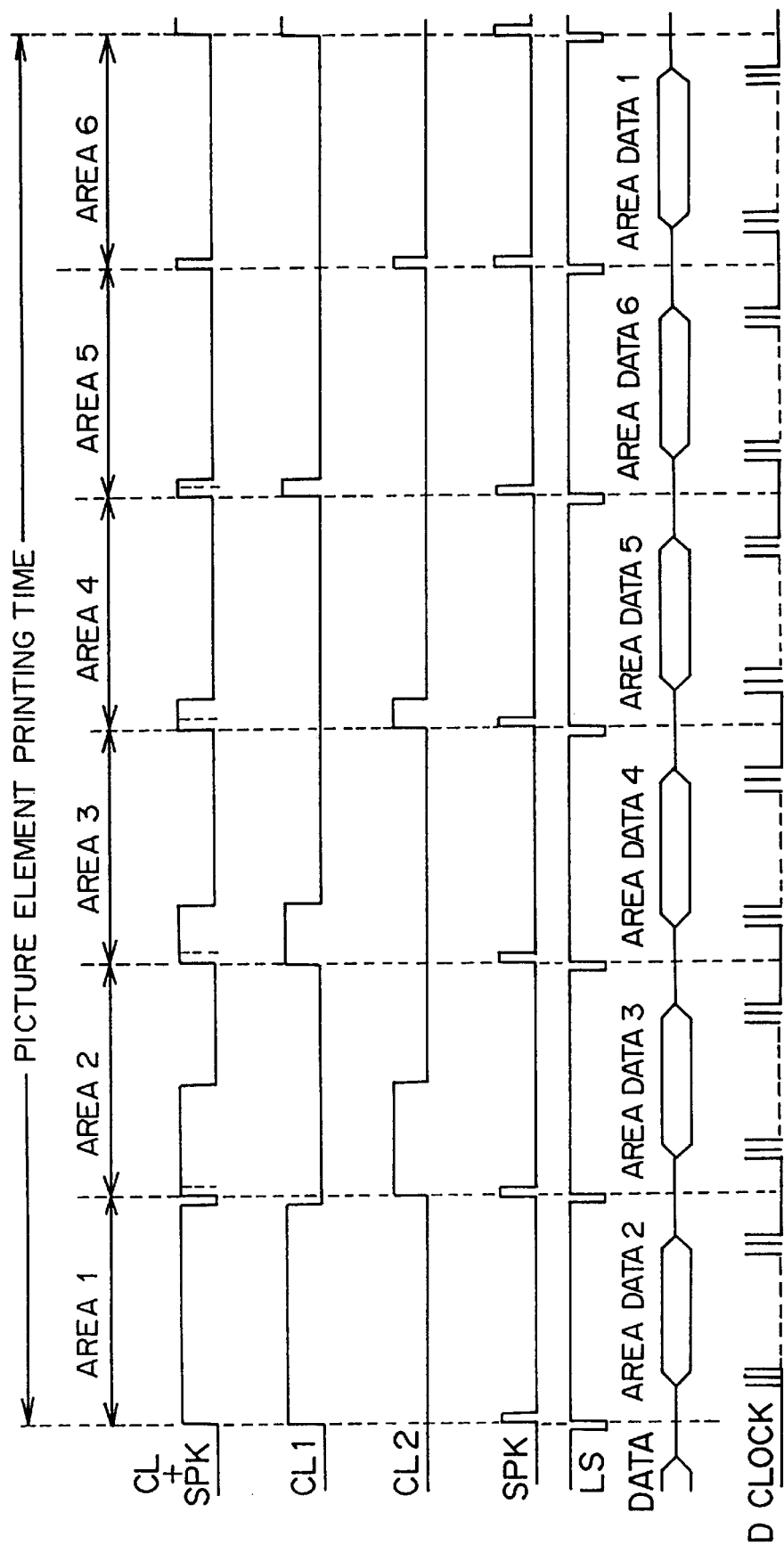
FIG. 16 is a time chart showing timing of operation of a modified control circuitry of the third embodiment.

In the third embodiment, the driving circuit is so made that each light shutter element 162 is impressed with the driving voltage in accordance with the control signal CL and the micro duration pulse signal SPK continuously in two consecutive areas (for example, areas 1 and 2, and areas 3 and 4). However, as shown in FIG. 16, the impression may be carried out separately in each area. In this case, the micro duration pulse signal SPK shall be generated in every area.

Although in the third embodiment, the control signal CL has different pulse durations in the areas 1 to 6, the pulse duration of the control signal CL may be fixed in all the areas 1 to 6. Further, in addition to the 64-tone light signal generating device, a 16-tone light signal generating device, a 32-tone light signal generating device and a 128-tone light signal generating device are possible.

Other Embodiments

Although the present invention has been described in connection with the preferred embodiments above, it is to be noted that various changes and modifications will be possible to those who are skilled in the art. Such changes and modifications are to be understood as being within the scope of the present invention.

The present invention is applicable to a copying machine, a facsimile, a printer for silver salt films and so on as well as the display and the printer.

What is claimed is:

1. A light signal generating device for an apparatus having a photosensitive member and a light source to irradiate the photosensitive member, the light signal generating device comprising:

a light shutter having an electro-optical effect to selectively pass a predetermined level of light from the light source to said photosensitive member, said light shutter being positioned so as to be between the light source and the photosensitive member;

a first signal generator, said first signal generator including an input and a modulator, wherein said input is suitable for receiving input data from a data source, wherein said modulator generates a first signal, said first signal having a first frequency, said first signal having a pulse duration which is modulated with the input data to enable said light shutter to pass an amount of light from said light source to expose the photosensitive member in accordance with the input data;

a second signal generator which produces a second signal at a constant frequency substantially equal to the first frequency of the first signal, said second signal having a pulse duration which is so short that the light shutter passes a smaller quantity of light when the light shutter is impressed only with said second signal than a quantity of light which otherwise leaks through the light shutter when the light shutter is impressed with no signal;

a signal combining circuit which receives the first signal and the second signal and outputs a composite signal which is comprised of both the first signal and the second signal; and a driver which receives the composite signal and applies a voltage to said light shutter in response to the composite signal.

2. A light signal generating device as claimed in claim 1, wherein the light shutter comprises a light shutter element made of PLZT.

3. A light signal generating device for an apparatus having a photosensitive member and a light source to irradiate the photosensitive member, the light signal generating device comprising:

a light shutter array comprising a line of light shutter elements having an electro-optical effect to individually and selectively pass a predetermined level of light from the light source to said photosensitive member, said line of light shutter elements being positioned so as to be between the light source and the photosensitive member;

a first pulse signal generator, said first signal generator including an input and a modulator, wherein said input is suitable for receiving input data from a data source, wherein said modulator generates a first pulse signal, said first pulse signal having a first frequency, each pulse of said first pulse signal having a pulse duration which is modulated with the input data to enable said light shutter array to pass an amount of light from said light source to expose the photosensitive member in accordance with the input data;

a second pulse signal generator which produces a second pulse signal at a constant frequency substantially equal to the first frequency of the first pulse signal, said second pulse signal having a pulse duration which is so short that a light shutter element passes a smaller quantity of light when that light shutter element is impressed only with said second pulse signal than a quantity of light which otherwise leaks through the light shutter when the light shutter is impressed with no signal;

a signal combining circuit which receives the first pulse signal and the second pulse signal and outputs a composite pulse signal which is comprised of both the first pulse signal and the second pulse signal; and a driver which receives the composite pulse signal and applies a voltage to said light shutter elements in response to the composite pulse signal.

4. A light signal generating device as claimed in claim 3, wherein the light shutter elements are made of PLZT.

5. A light signal generating device for an apparatus having a photosensitive member and a light source to irradiate the photosensitive member, the light signal generating device comprising:

a light shutter array comprising a line of light shutter elements having an electro-optical effect to individually and selectively pass a predetermined level of light from the light source to said photosensitive member, said line of shutter elements being positioned so as to be between the light source and the photosensitive member;

a first pulse signal generator, said first pulse signal generator including an input and a modulator, wherein said input is suitable for receiving input data from a data source, wherein said modulator generates a first pulse signal modulated with the input data at a first frequency to drive the light shutter elements, the first pulse signal having a pulse duration which enables said light shutter array to pass an amount of light from said light source to expose the photosensitive member in accordance with the input data;

a second pulse signal generator which produces a second pulse signal regardless of the input data, the second pulse signal having a constant frequency, such frequency being substantially equal to the first frequency, and a pulse duration which is so short that a light shutter element passes a smaller quantity of light when that light shutter element is impressed only with said second pulse signal than a quantity of light which otherwise leaks through the light shutter when the light shutter is impressed with no signal;

a signal combining circuit which receives the first pulse signal and the second pulse signal and outputs a composite pulse signal which is comprised of both the first pulse signal and the second pulse signal; and a driver which receives the composite pulse signal and applies a voltage to said light shutter elements in response to the composite pulse signal.

6. A light signal generating device as claimed in claim 5, wherein the light shutter elements are made of PLZT.

7. A light signal generating device as claimed in claim 5, wherein the first pulse signal generator comprises a control pulse signal generator which produces a control pulse signal with a specified pulse duration at a specified frequency, and an AND element which receives the input data and the control pulse signal and generates the first pulse signal.

8. A light signal generating device as claimed in claim 5, wherein the signal combining circuit comprises an OR element which receives the first pulse signal and the second pulse signal and generates the composite pulse signal.

9. An apparatus comprising;

a photosensitive member;

a light source which is suitable for irradiating the photosensitive member;

a light shutter array comprising a line of light shutter elements having an electro-optical effect, said line of light shutter elements being provided between the light source and the photosensitive member;

a first pulse signal generator, said first pulse signal generator including an input and a modulator, wherein said input is suitable for receiving multitone image data for at least one picture element from a data source, wherein said modulator generates first pulse signals modulated with the multitone image data at a first frequency to drive the light shutter elements, each of the first pulse signals having a pulse duration which enables said light shutter elements to pass an amount of light from said light source to expose the photosensitive member in accordance with the input data;

a second pulse signal generator which produces second pulse signals regardless of the multitone image data, the second pulse signals having a constant frequency, such frequency being substantially equal to the first frequency, and a pulse duration which is so short that a light shutter element passes a smaller quantity of light when that light shutter element is impressed only with said second pulse signal than a quantity of light which otherwise leaks through the light shutter when the light shutter is impressed with no signal;

a signal combining circuit which receives the first pulse signals and the second pulse signals and outputs a composite pulse signal which is comprised of both the first pulse signals and the second pulse signals; and a driver which receives the composite pulse signals and applies a voltage to said light shutter elements in response to the composite pulse signals.

10. An apparatus as claimed in claim 9, wherein:

a time period for producing one picture element from the multitone image data is divided into a plurality of areas; and each of the first pulse signals is generated in each of said plurality of areas.

11. An apparatus as claimed in claim 10, wherein the first pulse signals generated in the time period for producing one picture element have different pulse durations from each other.

12. An apparatus as claimed in claim 11, wherein:

the multitone image data for one picture element has a plurality of bits; and a number of the areas in the time period for producing one picture element corresponds to a number of the bits, while the pulse duration of the first pulse signal in each of the areas corresponds to each of the bits of the multitone image data.

13. An apparatus as claimed in claim 10, wherein the driver applies the voltage to said light shutter elements continuously in consecutive areas in response to the first pulse signals and the second pulse signals when the first pulse signals are generated in said consecutive areas.

14. A light signal generating device for an apparatus having a photosensitive member and a light source to irradiate the photosensitive member, the light signal generating device comprising:

a light shutter array comprising a line of light shutter elements having an electro-optical effect to individually and selectively pass a predetermined level of light from the light source to said photosensitive member, each of said light shutter elements being positioned so as to be between the light source and a corresponding portion of the photosensitive member;

a first signal generator, said first signal generator including an input and a modulator, wherein said input is suitable for receiving input data from a data source, wherein said modulator generates first pulse signals, said first pulse signals having a first frequency and having pulse durations which are modulated in accordance with the input data, each of the first pulse signals having a pulse duration which enables a corresponding one of said light shutter elements to pass an amount of light from said light source to expose the corresponding portion of the photosensitive member in accordance with the input data, a light shutter element being turned on when a first pulse signal applied thereto has at least a predetermined level and is turned off when the first pulse signal applied thereto is less than the predetermined level;

a second pulse signal generator which produces second pulse signals, regardless of the image data, the second pulse signals having a constant frequency, such frequency being substantially equal to the first frequency, and a pulse duration which is less than 2 $\mu$sec.;

a signal combining circuit which receives the first pulse signals and the second pulse signals and outputs composite signals which are comprised of both the first pulse signals and the second pulse signals; and a driver which receives the composite signals and applies a voltage to said light shutter elements in response to the composite signals, whereby all of said light shutter elements are subjected to the same driving frequency regardless of the input data.

15. A light signal generating device as claimed in claim 14, wherein:

a time period for producing one picture element from the image data is divided into a plurality of areas; and each of the first pulse signals is generated in each of said plurality of areas.

16. A light signal generating device as claimed in claim 15, wherein the first pulse signals generated in the time period for producing one picture element have different pulse durations from each other.

17. A light signal generating device as claimed in claim 16, wherein:

the image data comprises multitone image data for at least one picture element;

the multitone image data for one picture element has a plurality of bits, and a number of the areas in the time period for producing one picture element corresponds to a number of the bits, while the pulse duration of the first pulse signal in each of the areas corresponds to each of the bits of the multitone image data.

18. A light signal generating device as claimed in claim 15, wherein the driver applies the voltage to said light shutter elements continuously in consecutive areas in response to the first pulse signals and the second pulse signals when the first pulse signals are generated in said consecutive areas.

19. A light signal generating device as claimed in claim 14, wherein the second pulse signals have a pulse duration which is less than about 1 $\mu$sec.

20. A light signal generating device as claimed in claim 14, wherein a light shutter element impressed with only a second pulse signal transmits a smaller quantity of light than when it is impressed with a direct voltage of zero volts.

* * * * *